United States Patent
Flöter

(10) Patent No.: US 7,247,335 B2
(45) Date of Patent: Jul. 24, 2007

(54) TRIGLYCERIDE FAT SUITABLE FOR SPREAD MANUFACTURE

(75) Inventor: Eckhard Flöter, Vlaardingen (NL)

(73) Assignee: Unilever Bestfoods, North America, division of Conopco Inc., Englewood Cliffs, NJ (US)

( * ) Notice: Subject to any disclaimer, the term of this patent is extended or adjusted under 35 U.S.C. 154(b) by 98 days.

(21) Appl. No.: 10/375,610

(22) Filed: Feb. 27, 2003

(65) Prior Publication Data

US 2003/0161934 A1 Aug. 28, 2003

(30) Foreign Application Priority Data

Feb. 28, 2002 (EP) .................................. 02075801

(51) Int. Cl.
*A23D 9/00* (2006.01)
(52) U.S. Cl. ...................................... 426/607; 426/601
(58) Field of Classification Search ................ 426/601, 426/602, 603, 604
See application file for complete search history.

(56) References Cited

U.S. PATENT DOCUMENTS

| | | | |
|---|---|---|---|
| 4,447,462 A | | 5/1984 | Tafuri et al. |
| 4,588,604 A * | | 5/1986 | Baker et al. ................. 426/601 |
| 4,839,192 A | | 6/1989 | Sagi et al. |
| 5,424,091 A * | | 6/1995 | Cain et al. ................... 426/610 |
| 5,939,114 A * | | 8/1999 | Cain et al. ................... 426/101 |
| 5,972,412 A | | 10/1999 | Sassen et al. |
| 6,171,636 B1 | | 1/2001 | Sassen et al. |
| 6,475,548 B2 * | | 11/2002 | Bons et al. .................. 426/603 |
| 7,108,888 B2 * | | 9/2006 | Floeter ........................ 426/603 |
| 7,118,773 B2 * | | 10/2006 | Floeter et al. .............. 426/603 |
| 2002/0114874 A1 * | | 8/2002 | Floeter et al. .............. 426/602 |
| 2002/0122868 A1 * | | 9/2002 | Floeter et al. .............. 426/602 |
| 2004/0071856 A1 * | | 4/2004 | Floeter ........................ 426/607 |

FOREIGN PATENT DOCUMENTS

| | | |
|---|---|---|
| EP | 719 091 | 12/1997 |
| WO | 95/20313 | 8/1995 |
| WO | 97/28695 | 8/1997 |
| WO | 00/74470 | 12/2000 |
| WO | 01/96507 | 12/2001 |
| WO | 02/41698 | 5/2002 |
| WO | 02/41699 | 5/2002 |
| WO | WO 02/41699 * | 5/2002 |

OTHER PUBLICATIONS

Hui, 1996. Bailey's Industrial Oil and Fat Products, 5th edition, vol. 2, John Wiley & Sons, Inc., New York, p. 1, 45, 46.*
Swern, 1979. Bailey's Industiral Oll and Fat Products, vol. 1, John Wiley & Sons, New York, p. 419.*
International Search Report on Application No. EP 02 07 5801 mailed Jul. 11, 2002.
International Search Report on PCT/EP 03/00990 mailed Apr. 9, 2003.
Oil Crops Monograph from Internet Accessed, Jun. 6, 2005.
Bailey's Industrial Oil and Fat Products, edited by Daniel Swem, 1964, pp. 7-12.

* cited by examiner

*Primary Examiner*—Carolyn Paden
(74) *Attorney, Agent, or Firm*—Gerard J. McGowan, Jr.

(57) ABSTRACT

Triglyceride fat which comprises HUU triglycerides and at least 18 wt. % of HOH and HLH triglycerides, while the ratio HOH:HLH is in the range 30/70 to 85/15, which fat is characterized in that the fat contains at least 20 wt. % of HUU and 8–30 wt. % of SOO triglycerides, where O denotes the residue of oleic acid, S of stearic acid, L of linoleic acid, U of oleic acid or linoleic acid and H denotes the residue of a saturated fatty acid with more than 15 carbon atoms with the proviso that at least 50 wt. % of the saturated fatty acids in HOH, HLH and HUU are stearic acid. The fat is obtained preferably by blending two natural high stearic fats.

14 Claims, No Drawings

TRIGLYCERIDE FAT SUITABLE FOR SPREAD MANUFACTURE

FIELD OF THE INVENTION

The present invention deals with a fat suitable for the manufacture of fat continuous emulsion spreads, with a process for the preparation of such fat and with emulsion spreads containing such fat.

THE RELATED ART

Butter is an edible emulsion spread consisting of a continuous fat phase and an aqueous phase which is dispersed as fine droplets in the fat phase. The fat phase consists of dairy fat, a 100% natural fat. Margarine too is a fat continuous emulsion, but margarine fat is not natural, since it has been processed so that margarine obtains properties which are desirable for a spread. Generally, the fat phase of margarine and of similar fat continuous emulsion spreads is a mixture of a fat which is fully liquid (the oil part of the fat phase) and a fat which is solid at ambient temperature.

The solid fat, further denoted as hardstock fat, serves to structure the fat phase and helps to stabilize the emulsion. For imparting to common margarine a semi-solid, plastic, spreadable consistency this stabilizing and structuring functionality plays an important role. The crystals of the solid fat form a network throughout the liquid oil resulting into a structured fat phase. The aqueous phase droplets are fixed within the spaces of the lattice of solid fat crystals. In this way coalescence of the droplets and separation of the heavier aqueous phase from the fat phase is prevented.

The technology of spread processing is well established. The type of fat and the ratio of liquid oil and solid fat are chosen such that after proper processing of the fat blend with an aqueous phase a plastic product with a suitable consistency and mouthfeel is obtained.

Unprocessed liquid vegetable oils are the major ingredient in the composition of margarine fats. Vegetable fats are preferred over animal fats because their high content of unsaturated fatty acid residues enhances the spread's nutritional value. Besides that, vegetable fats are an abundant and relatively cheap resource. However, natural, non-processed vegetable fats which as such are suited as the hardstock fat ingredient are rather rare. Suitable hardstock fats are usually obtained by applying one or more blending, fractionation, hydrogenation and interesterification treatments upon a liquid vegetable oil.

The present trend in food processing is to avoid processing, particularly when it is chemical processing as much as possible and to opt for natural ingredients and natural treatments. Natural means that the fat ingredients have a natural origin and after harvesting have been subjected to no other treatment than a refining or purification treatment. The only accepted modification treatments are enzymatic rearrangement and dry fractionation because these are considered to be natural and therefore do not conflict with ECO certification. Present consumer appreciation strongly determines this "natural preference" trend. Use of natural products and natural processes may also contribute to the economy of the spread production.

Generally, fats with a high content of HUH triglycerides are known for their good structuring properties. H denotes a saturated fatty acid residue with more than 15 carbon atoms, such as palmitic acid (C16) or stearic acid (C18) and U denotes the unsaturated C18 fatty acid residues oleic acid (C18:1) and linoleic acid (C18:2).

Cacao butter is the only unprocessed hardstock fat which contains a high amount of HUH triglycerides and which, in principle, is suited for margarine production. However, a spread prepared with cacao butter as hardstock fat shows defects of which the most serious one is that during storage fat grains are formed, which presence imparts to the spread an unpleasant gritty mouthfeel. It has been found that the high content of palmitic acid in the hardstock fat is the cause of this phenomenon.

Besides that, cacao butter is too expensive to serve as regular hardstock fat.

From EP 719091 it appears that shea fat, also having a high content of HUH triglycerides, can be used but only after fractionation, since it contains up to 10 wt. % of non-saponifiable matter which has to be removed. The stearin contains 73 wt. % of HUH where nearly all H are stearic acid residues and nearly all U are oleic acid residues. The high costs of the fat and of its fractionation are prohibitive for the commercial use of shea stearin in spread manufacture. WO 01/96507 teaches that a high stearic oil can be used in an oil blend which is suited as fat phase for spread manufacture but only after the high stearic oil has been fractionated.

A natural, non-processed hardstock fat with a high content of HUH in which H mainly is a stearic acid residue still is a much sought ingredient for the manufacture of emulsion spreads which claim a wholly natural fat phase.

WO 02/41699 describes a fat which without preceding processing, such as fractionation, can be used as a natural hardstock fat. However, this fat has the disadvantage that it is rather rare. For spread manufacture on an industrial scale sourcing may become a problem.

The present invention provides a solution for the wish to have available a suitable fat phase for spread manufacture which is prepared from a fat which has a natural origin, has been subjected to natural processing only and which does not need the addition of a separate hardstock fat. The emulsion spread obtained with such fat must show a good oral response and must contain just enough saturated fatty acids for providing emulsion stability.

SUMMARY OF THE INVENTION

We have found the presence of HUU triglycerides in specific amounts to be a critical factor in obtaining good fat phase functionality which results in a spread product with a desired temperature/hardness profile and with a good oral response.

We have found that fats with the triglyceride composition as defined in claim 1 are suited for use as fat phase in the manufacture of emulsion spreads.

The invention further provides means for obtaining such fats, preferably by merely blending two unprocessed natural vegetable fats, preferably so-called high stearic oils. The blend allows the production of emulsion spreads which have a natural fat phase.

DETAILS OF THE INVENTION

Fats and oils are terms which are used interchangeably in this specification. Oils specifically denote fats which are liquid at ambient temperature.

The present invention provides fats which are suited as fat phase components for spread manufacture. The fats are characterized by a content of specific triglycerides, particularly of HUU triglycerides and from these the SOO triglycerides.

Such triglyceride fat comprises HUU triglycerides and at least 18 wt. %, preferably at least 20%, more preferably at least 22% of HOH and HLH triglycerides, while the ratio HOH:HLH is chosen form the range 30/70–85/15 and is characterized in that the fat contains 8–30 wt. %, preferably 10–30 wt. % of HOO preferably of SOO and at least 20 wt. %, preferably at least 25 wt. % of HUU, where S denotes the residue of stearic acid, O the residue of oleic acid, L of linoleic acid, U of oleic acid or linoleic acid and H denotes the residue of a saturated fatty acid with more than 15 carbon atoms with the proviso that at least 50 wt. %, preferably 60 wt. %, more preferably 70 wt. %, still more preferably 80 wt. % of the saturated fatty acids in HOH, HLH and HUU consist of stearic acid.

It has been found that such fats can be obtained by blending high stearic vegetable oils. Such high stearic oils are oils of which the stearic acid content is higher than the content of the corresponding wild type oils which means that their content of stearic acid residues is at least 12 wt. %, preferably at least 15 wt. %. A specific type is the so-called high stearic, high oleic sunflower seed oil, where also the content of oleic acid residues being at least 40 wt. % exceeds the content in wild type sunflower seed oils. Preferably oils are employed which have been obtained from non-genetically modified (non-GMO) seed material.

High stearic oils have been described in EP 741511 and WO 00/74470. The triglyceride composition of such oils is known from standard analysis. The skilled man is able to use this information for establishing proper ratios for blending such high stearic oils so that a fat blend composition as claimed is obtained.

For blending preferably high stearic oils are chosen which contain HUU and HUH triglycerides in a preferred ratio HUU:HUH>0.8, more preferably >1, still more preferably >1.1.

For blending the invention includes, however, the use of oils from other sources, provided they possess a suitable triglyceride composition so that the final triglyceride blend composition is in accordance with the claims.

When a modification of the natural starting oils is needed preferably only a natural treatment is used, which is a treatment selected from the group consisting of refining, dry fractionation and blending. Enzymatic rearrangement, although considered natural, preferably is not used.

A separate embodiment of the invention are spreads consisting of a fat continuous emulsion of which the fat phase contains an oil according to the present invention.

The technology for processing the found fats into a plastic spread product using standard ingredients is well known to the man skilled in the art and can be found with all details in various textbooks such as K. A. Alexandersen, Margarine Processing Plants and Equipment (Vol.4, Bailey's Industrial Oil and Fat Products, Wiley and Sons Inc., New York 1996) and The Chemistry and Technology of Edible Oils and Fats and their High Fat Products (G. Hoffmann; Academic Press London,1989, page 319 ff).

15–90 wt. % of the final emulsion spread consists of the aqueous phase. It may contain, besides water the usual spread ingredients such as proteins e.g. whey powder or skimmed milk powder, structuring agents, thickening agents and gelling agents such as gelatine, an edible acid, such as lactic acid or citric acid and a preservative such as potassium sorbate. The fat phase which comprises 10–85 wt. % of the spread, consists of the claimed new triglyceride fat. The fat may be supplemented with the usual fat phase ingredients as are emulsifiers like lecithin and partial glycerides, a flavouring agent and a colouring agent such as beta-carotene.

The consecutive devices which constitute a spread manufacturing line comprise one or more of the group consisting of scraped surface heat exchangers, cooling coils, single-screw coolers, tubular heat exchangers, twin screws, pin stirrers, homogenizers, colloid mills and pressure valves. They are employed according to current spread manufacturing technology. A usual sequence is the A-A-C sequence where A denotes a scraped surface heat exchanger and C denotes a pin stirrer, but various alternative sequences well known to the skilled man may do as well. The skilled man is able to establish by some trials to optimize the combination of equipment, ingredients and processing conditions.

The invention provides a natural fat phase with which excellent fat continuous emulsion spreads can be prepared.

The following examples illustrate the invention:

EXAMPLES

General

Protocol for Measurement of Stevens Values

Hardness is a very relevant spread property. It is expressed as a Stevens value and established with standard measuring equipment.

For assessment a Stevens-LFRA Texture Analyser (ex Stevens Advanced Weighing Systems, Dunmore, U.K.) is used. The so-called "Stevens$_{4.4}$" hardness S(t) at temperature t is expressed in grams. Measurement specifications: 4.4 mm diameter probehead cylinder; load range 1000 g; device operated "normal" and set at 10 mm penetration depth and 1 mm/sec penetration rate. Before measuring the spread is equilibrated at the measuring temperature for 24 hours.

Solid Fat Contents

After the prescribed period for storage and cycling solid fat contents (SFC) were measured according to the standard procedures given with the benchtop NMR equipment (Bruker™ 120).

If not indicated otherwise all percentages are weight percentages.

Example 1

A spread was prepared consisting of

| | |
|---|---|
| 80% | fat phase |
| 20% | aqueous phase |

Composition of the Fat Phase

| | |
|---|---|
| 99.7% | triglyceride fat |
| 0.3% | distilled unsaturated monoglycerides |

The triglyceride fat of the fat phase was obtained by mixing 1 weight part of the high stearic, high oleic sunflower oil as described in WO 00/74470 (oil A) with 1 weight part of the high stearic sunflower oil described in EP 741511 (oil B). The oils are produced from non-genetically modified seeds. Table I shows the composition of relevant triacyl glycerides (TAG)—of oils A and B and of a 1:1 mixture of oils A and B.

TABLE I

| TAG - Composition* | Sunflower High stearic High oleic (oil A) | Sunflower High stearic (oil B) | 1:1 mix of (A) and (B) |
|---|---|---|---|
| HOH | 19.3 | 9.5 | 14.4 |
| HLH | 1.0 | 23.0 | 12 |
| HOO | 43.0 | 6.2 | 24.6 |
| HLO/HOL/HLL | 5.0 | 45.0 | 25 |
| Rest | 31.7 | 16.3 | 24 |

*determined by traditional silverphase liquid chromatography

Composition of the Aqueous Phase:

| | |
|---|---|
| 92% | water |
| 0.1% | citric acid |
| 0.2% | potassium sorbate |
| 5.0% | salt |
| 2.7% | whey powder |

Each of the three fats of Table I were used for producing spreads employing standard labscale equipment (scraped surface heat exchangers (A-units) and pin stirrers (C-units)).

A crude premix (T=60° C.) of the fat phase and the aqueous phase was processed through an A-A-C sequence. Volumes: A-units 18.3 ml, C-unit 150 ml. Throughput 2.5 kg/hour. Rotational shaft speed of both A-units: 600 rpm, of the C-unit: 250 rpm. Outlet temperatures of the scraped surface heat exchangers: approximately 6° C.

The three spreads after filling into tubs, were initially stored at the filling temperature of 12° C. and then at the temperatures indicated in Table II.

For each spread Stevens values were measured first after one and then after nine weeks of storage at the indicated temperatures. The effect on hardness of temperature cycling for one day up to 20° C. and up to 25° C. respectively was measured as well.

The appearance and the structure of the spreads were monitored over a period of several weeks.

TABLE II

| | Oil A spread | Oil B spread | Oil C (A:B = 1:1) spread |
|---|---|---|---|
| Stevens$_{4.4}$ values after 1 week storage at | | | |
| 5° C. | 3450 | 428 | 332 |
| 15° C. | 484 | 52 | 120 |
| 20° C. | 119 | 5 | 47 |
| Stevens$_{4.4}$ values after cycling for one day | | | |
| (5°–20°–5° C.) | 2650 | 413 | 345 |
| (5°–25°–5° C.) | 2330 | | 310 |
| Stevens$_{4.4}$ values after 9 weeks of storage | | | |
| 5° C. | 2680 | 306 | 321 |
| 15° C. | 1121 | 143 | 124 |
| 20° C. | 138 | 8 | 42 |
| Stevens$_{4.4}$ values after cycling for one day | | | |
| (5°–20°–5° C.) | 2452 | 241 | 334 |
| (5°–25°–5° C.) | 2631 | n.a. | 307 |

TABLE III

| | Oil A spread | Oil B spread | Oil C (A:B = 1:1) spread |
|---|---|---|---|
| SFC after 1 week storage at | | | |
| 5° C. | 52.1 | 33.2 | 19.5 |
| 15° C. | 39.2 | 15.5 | 10.7 |
| 20° C. | 17.3 | 1.5 | 7.8 |
| SFC after cycling one day | | | |
| 5°–20°–5° C. | 51 | 20.7 | 18.7 |
| 5°–25°–5° C. | 53.3 | n.a.* | 19.2 |

*Not applicable: sample collapsed

Use of the invented fat C resulted in acceptable hardness values for the whole temperature range, while the two reference spreads based on oils A and B were too hard at low temperatures and the spread based on oil B was also too soft at ambient temperatures.

For the temperature cycling test all three spreads were exposed to a temperature of 20° and 25° C. respectively for 24 hours. After the test the differences in hardness became even more apparent.

The spread according to the invention withstood the high ambient temperature and fully recovered when placed again at the original refrigerator temperature. To the contrary the reference product based on oil B which is rich in HLH, at 25° C. suffered from severe oil exudation and was practically collapsing. The sample based on oil A with a high level of HOO triglycerides withstood the high temperatures but was much too hard at low temperatures.

A test panel evaluated the overall appreciation of the product structure. The sample according to the invention scored very positive, in particular on aspects as melting behavior, spreadability and homogeneity of the structure. The two comparison samples scored very low on spreadability. Also their structure was much less appreciated due to in-homogeneity and brittleness.

Example II

The procedure of example 1 was used for the preparation of a 70% fat spread. Outlet temperatures of the scraped surface heat exchangers: approximately 8° C. For the fat phase the (35/10/55) triglyceride fat blend of Table IV was used. It was obtained by blending a stearin fraction of a sunflower variety with high stearic and high oleic content according to WO 01/96507 (example 1), a high stearic soybean oil as described in WO 97/28695 (example 1) and generic sunflower oil in the weight ratio 35:10:55 respectively.

The characteristic TAG's of the three starting materials and of the fat composition are given in Table IV.

TABLE IV

| TAG - Composition wt. %** | Stearin fraction of High stearic High oleic Sunflower oil | High stearic Soybean oil | Generic sunflower oil | Fat blend (35/10/55) |
|---|---|---|---|---|
| HOH | 57.8 | 7.8 | 0.8 | 21.5 |
| HLH* | 2.4 | 16.9 | 2.8 | 4.1 |
| HOO | 26.4 | 5.5 | 1.6 | 10.7 |
| HLO/HOL/HLL* | 2.8 | 43.9 | 28.1 | 20.8 |
| Rest | 10.6 | 25.9 | 66.7 | 42.9 |

*L denotes linoleic acid and other polyunsaturated fatty acid residues.
**determined by traditional silverphase liquid chromatography The spreads when filled into tubs were initially stored at the filling temperature of 10° C. and then at the temperatures indicated in table V. Over a period of several weeks the appearance and the structure of the spreads were monitored. Stevens values were measured after one and after six weeks of storage.

TABLE V

| Storage time | Temperature ° C. | Stevens value (4.4) in g |
|---|---|---|
| 1 week | 5 | 98 |
| 1 week | 10 | 91 |
| 1 week | 15 | 82 |
| 1 week | 20 | 61 |
| 1 week | 25 | 54 |
| 6 week | 5 | 87 |
| 6 week | 10 | 85 |
| 6 week | 15 | 77 |
| 6 week | 20 | 59 |
| 6 week | 25 | 48 |

The spread was also subjected to temperature cycling consisting in a temporary exposure to 25° C. for 24 h. The product did not show any oiling out, nor any other signs of structural changes.

In comparison with current commercial spreads the product was rated as excellent by an assessment panel for its extremely quick melting behaviour and its almost temperature independent hardness.

The invention claimed is:

1. A triglyceride fat which comprises HUU triglycerides and at least 18 wt. % of HOH and HLH triglycerides, while the ratio HOH:HLH is chosen form the range 30/70–85/15, where the fat contains contains 8–30 wt. % of HOO and at least 20 wt. % of HUU triglycerides, where O denotes the residue of oleic acid, L of linoleic acid, U of oleic acid or linoleic acid and H denotes the residue of a saturated fatty acid with more than 15 carbon atoms with the proviso that at least 50 wt. % of the saturated fatty acids in the group of triglycerides consisting of HOH, HLH and HUU consist of stearic acid.

2. A triglyceride fat according to claim 1, which comprises at least 22 wt. % of HOH and HLH triglycerides.

3. A triglyceride fat according to claim 1, which comprises at least 25 wt. % of HUU triglycerides.

4. A triglyceride fat according to claim 1, where the fat contains 10–30 wt. % of HOO.

5. A triglyceride fat according to claim 1, where HOO is SOO, where S denotes the residue of stearic acid.

6. A triglyceride fat according to claim 1, where at least 60 wt. % of the saturated fatty acids in the group of triglycerides consisting of HOH, HLH and HUU consist of stearic acid.

7. A process for the preparation of the fat according to claim 1, comprising blending at least two non-processed fats of which at least two have a stearic content which is increased compared to oil from wild type seeds and which fats have a stearic content which is at least 12 wt. %.

8. A process according to claim 7, where the high stearic oils contain HUU and HUH triglycerides in a ratio HUU:HUH>0.8.

9. A process according to claim 7, where the high stearic oils contain HUU and HUH triglycerides in a ratio HUU:HUH>1.1.

10. A process according to claim 7, where the high stearic oils originate from non-GMO seeds.

11. A process according to claim 7, where non-fractionated oils are used.

12. A process according to claim 7, where at least one of the high stearic oils is a high stearic sunflower oil or a high stearic high oleic sunflower oil.

13. A food composition containing a fat phase, where the fat phase comprises a triglyceride fat according to claim 1.

14. A fat continuous emulsion spread consisting of an aqueous phase dispersed in a fat phase, where the fat phase comprises a triglyceride fat according to claim 1.

* * * * *